(12) United States Patent
Wohld et al.

(10) Patent No.: US 6,435,449 B1
(45) Date of Patent: Aug. 20, 2002

(54) METHOD AND DEVICE FOR CONTINUOUSLY CUTTING DURING HOT ROLLING

(75) Inventors: Dietrich Wohld, Rauschenberg (DE); Walter Dragosics, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/530,979

(22) PCT Filed: Oct. 26, 1998

(86) PCT No.: PCT/DE98/03132

§ 371 (c)(1),
(2), (4) Date: Jun. 30, 2000

(87) PCT Pub. No.: WO99/24181

PCT Pub. Date: May 20, 1999

(30) Foreign Application Priority Data

Nov. 7, 1997 (DE) .......................................... 197 49 423

(51) Int. Cl.[7] .............................................. B65H 35/00
(52) U.S. Cl. .................................... 242/523.1; 242/527
(58) Field of Search .............................. 242/527, 527.1, 242/527.5, 527.6, 527.7, 526, 523.1, 535, 418, 418.1

(56) References Cited

U.S. PATENT DOCUMENTS 3,558,070 A * 1/1971 Gabriels .................. 242/523.1

FOREIGN PATENT DOCUMENTS

| GB | 2 073 080 | 1/1981 |
| JP | 41 47 716 | 5/1992 |
| JP | 41 71 116 | 6/1992 |
| JP | 7 236 916 | 9/1995 |
| JP | 80 90 058 | 4/1996 |

* cited by examiner

Primary Examiner—John M. Jillions
(74) Attorney, Agent, or Firm—BakerBotts LLP

(57) ABSTRACT

A method and a device for cutting a rolled strip which runs out from a hot-rolling mill train, especially at particularly high speed, is described. The rolled strip is cut by shears arranged downstream of the hot-rolling mill train, a driver having two driver rollers being arranged downstream of the shears, the rolled strip running through between the driver rollers, and the rolls of the driver being driven open subsequent to the cutting.

4 Claims, 4 Drawing Sheets

METHOD AND DEVICE FOR CONTINUOUSLY CUTTING DURING HOT ROLLING

FIELD OF THE INVENTION

The present invention relates to a method and a device for cutting a metal strip which runs out from a hot-rolling mill train, especially at particularly high speed. The metal strip is cut by shears arranged downstream of the hot-rolling mill train. A driver having two driver rollers is arranged downstream of the shears. The metal strip runs through the driver rollers.

BACKGROUND INFORMATION

In hot rolling, special requirements exists with respect to the cutting of metal strips, since hot rolling takes place at high strip speeds. Consequently, the cutting of a hot-rolled strip must be carried out at a high strip speed, as well. Due to the cutting at high speeds, an extremely short time is available for changing over from the conditions during the threading out of the front strip to the conditions necessary for threading in the rear strip. In particular, the speed of the driver rollers downstream of the shears downstream of the shears must change very quickly. Therefore, the drivers are required to have extremely low inertia. However, these requirements can only be met partially so that narrow limits are set on the cutting of hot-rolled strips with respect to the strip speed. During the cutting of fast metal strips, particularly when working with strips running out from a roll stand at a speed above 12 m/sec, a particular problem lies in the repercussions on the rolling process upstream of the shears.

Japanese Patent JP 8 90058 describes a method for cutting a metal strip in which, subsequent to the cutting, rollers arranged downstream are opened for passing the strip. British Patent No. GB 20 73 080 and Japanese Patent No. 4 171116 describe cutting of rolled strip which runs out from a mill train at high speed.

SUMMARY

An object of the present invention is to provide a method for cutting fast-running metal strips from a hot strip mill. Repercussions on an upstream mill train by the cutting of the metal strip are prevented or significantly reduced.

In the method according to the present invention, driver rollers on both sides of the shears are utilized. In the sequence of phases according to the present invention, the driver rollers downstream of the shears can be opened or closed subsequent to the cutting, the front tension then being guaranteed by the driver rollers upstream of the shears. In this manner, repercussions on the upstream rolling process due to the cutting can be prevented to the greatest possible extent. Thus, quality impairments of the rolled metal strip due to the cutting operation can be reduced. Cutting is now possible at high speeds, as well, without requiring parameters which cannot or only difficulty be achieved from a standpoint of mechanical engineering to be adjusted at the drivers.

In the present invention, the processes are decoupled by reducing the front tension in the metal strip between the driver rollers and the coiler prior to opening the driver rollers. In this manner, a particularly smooth strip run is achieved. Finally, the present invention has the advantage that the front tension of the metal strip between the driver rollers and driver rollers arranged upstream of the shears is reduced to a necessary minimum tension prior to cutting the metal strip. This further reduces the repercussions of the cutting on the rolling process, and results in a particularly accurate cut.

In this context, the necessary minimum tension is the tension in the metal strip which is required for the metal strip to be tightened and to be able to be cut.

In an example embodiment of the present invention, the rear metal strip resulting from the cutting of the metal strip is grasped by the coiler subsequent to opening the driver rollers. After the rear metal strip is grasped by the coiler, the driver rollers may be closed.

In the example device according to the present invention, driver rollers are provided upstream of and downstream of the shears. In this manner, in connection with the present invention, a particularly good decoupling between cutters and rolls is achieved. Advantageously, provision is made for a computing device which is connected to all system components via a data link.

DETAILED DESCRIPTION

In the following description of an exemplary embodiment of the present invention, the following abbreviations are used:

| | |
|---|---|
| DC | upcoiler |
| PR1 | driver rollers upstream of the shears |
| PR2 | driver rollers downstream of the shears |
| WR | working roll |
| $b_{strip}$ | strip width |
| $F_i$ | front tension upstream of system component 1 |
| $h_{strip}$ | strip thickness |
| $J_i$ | moment of inertia of the rollers including transmission, motor, etc. |
| $L_i$ | length between two neighboring system components upstream of component 1 |
| $M_{FF, i}$ | predefined torque |
| $M_i$ | motor torque |
| $M_{N, i}$ | rated torque of motor |
| $M_{Rel\%, i}$ | relative motor torque in % related to the rated torque |
| $R_i$ | roller radius |
| $V_{Add, i}$ | additional setpoint value of the speed or of the roller circumferential speed |
| $V_i$ | speed or roller circumferential speed |
| $V_i^*$ | setpoint value of speed or roller circumferential speed |
| $V_{strip}$ | normal value of the strip speed |
| $\sigma_i$ | specific front tension upstream of system component 1 |
| $\sigma M_{FF, i}$ | predefined torque converted into specific front tension |
| $\sigma M_i$ | motor torque converted into specific front tension |
| $\sigma_{OP, i}$ | specific front tension in the operating point upstream of system component 1 |
| t | time |

Index i designates the system components upcoiler (DC), driver rollers (PR1) upstream of the shears, driver rollers (PR2) or working rolls (WR) of the last stand of a mill train upstream of the cut adjustment.

Figure 1:
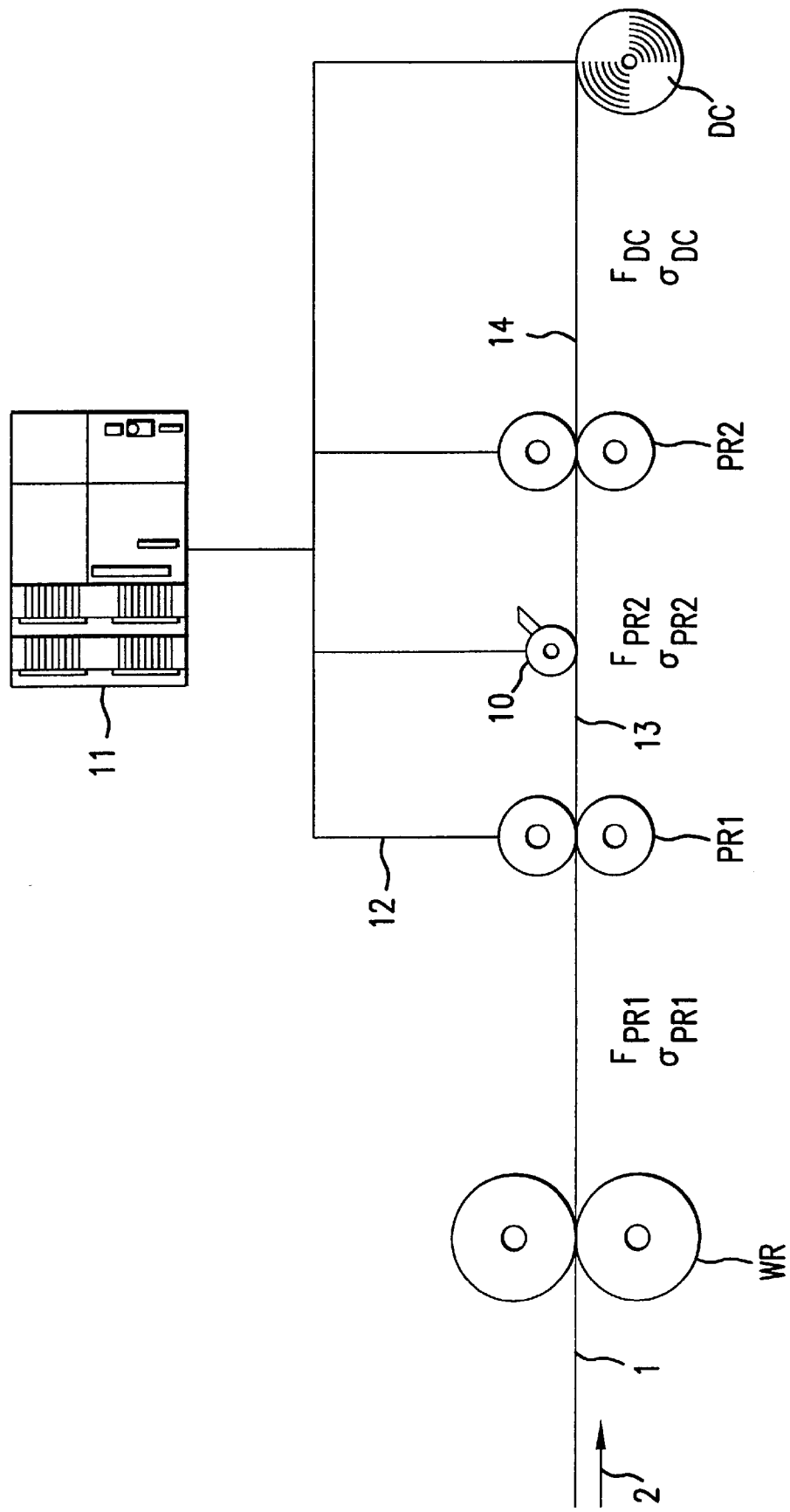
FIG. 1 shows an exemplary embodiment of a cutting device according to the present invention.

FIG. 1 shows a cutting device having shears 10, a stand with driver rollers PR1 upstream of shears 10, a stand with driver rollers PR2 downstream of shears 10, a coiler DC, as well as a computing device 11. Computing device 11 is connected by a data link via a data line 12 to the drives of driver rollers PR1 and PR2, of coiler DC, and of shears 10, the data line being designed in an exemplary embodiment of the bus system.

In FIG. 1, reference symbol 1 designates a metal strip, and the arrow designated by reference symbol 2 refers to the running direction of metal strip 1. Seen in the running direction of metal strip 1, a mill train for rolling metal strip 1 is arranged upstream of the cutting device. In this context, WP designates the working rolls of the last stand of this mill train.

Subsequent to the cutting of metal strip 1 by shears 10, metal strip 1 is divided into a front part 13 and a rear part 14. Coiler DC is designed in such a manner that it winds front metal strip 13 and rear metal strip 14 into different coils.

A motor torque $M_i$, where i (i=WR, PR1, PR2, DC), is delivered to the different system components, respectively, i.e., to working rolls WR, driver rollers PR1 and PR2, and to coiler DC. The system reacts to this with speeds or roller circumferential speeds $v_i$, where i (i=WR, PR1, PR2, DC), and front tensions $F_i$ or specific front tensions $\sigma_i$, where i (i=WR, PR1, PR2, DC).

Figure 2:
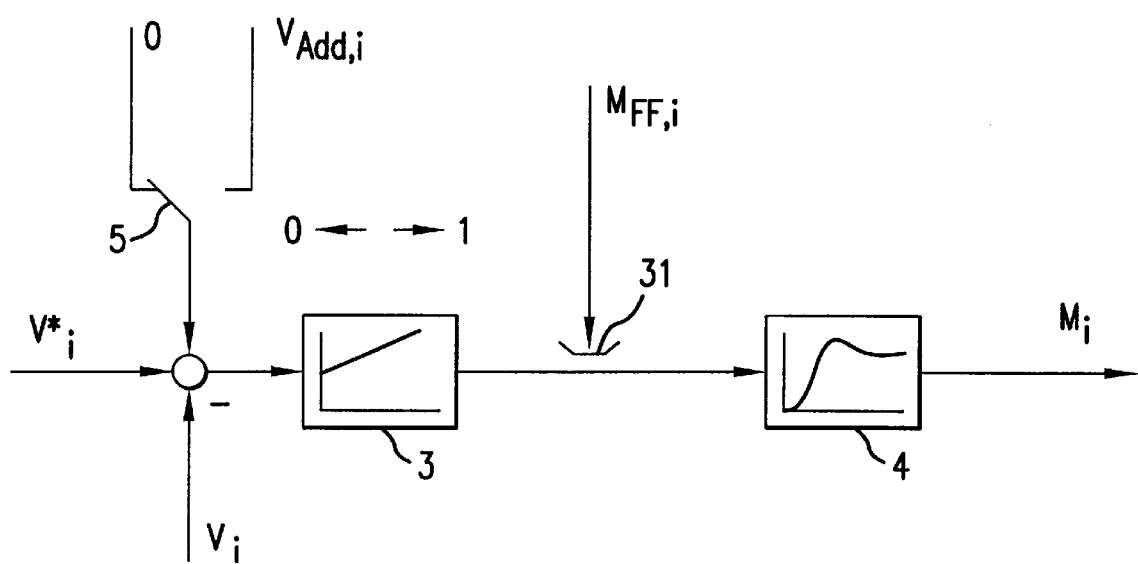
FIG. 2 shows an exemplary embodiment of a speed controller according to the present invention.

In an exemplary embodiment, system components driver rollers PR1, PR2, and coiler DC each are provided with a speed controller according to FIG. 2, which contains a PI controller 3. Applied to the input of this PI controller 3 are setpoint speed $v_i^*$ and actual speed $v_i$. Acting on the limiting of this PI controller 3 is a predefined torque $M_{FF,i}$. For simulating secondary current controls, a delay element of second order is connected in series to and downstream of PI controller 3, motor torque Mi being yielded at the output of the delay element.

The speed controllers can be operated in 2 modes:
Mode 0 (switch 5 toward the left)
When switch 5 is in this position, PI controller 3 operates as a normal speed controller, keeping the speed at its setpoint value.
Mode 1 (switch 5 toward the right)
An additional setpoint value $V_{Add,i}$ of the speed or of the velocity is added at the input of PI controller 3. The output of PI controller 3 is limited by a one-sided limiting 31. In this manner, in the case of a possible tear of metal strip 1, the speed can increase only to the extent until it deviates from the setpoint value by $V_{Add,i}$. In this operating mode, predefined torque $M_{FF,i}$ becomes active immediately as motor torque $M_i$. In this manner, a reliable operation is achieved.

The speed controllers are controlled in that the mode and torque $M_{FF,i}$ to be added are predefined for the speed controllers. These inputs are transmitted to the speed controllers via delay times which simulate the real transmission delay times.

To be able to better evaluate motor torque $M_i$, the relative motor torque in % is calculated using rated motor torque $M_{N,i}$:

$$M_{Rel\%,i} = \frac{M_i}{M_{N,i}} \cdot 100, \; i = WR, PR1, PR2, DC$$

In an exemplary embodiment, the time characteristic of the cutting of the metal strip is divided into the following phases:

Phase 1: starting state;

Phase 2: reduce front tension between PR1 and PR2 to a minimum tension;

Phase 3: cut and compensate for the previously existing minimum tension;

Phase 4: reduce front tension between PR2 and DC;

Phase 5: open PR2 and complete winding of front metal strip 14;

Phase 6: coiler grasps the new strip and builds up tension;

Phase 7: close PR2 and continue to build up coiler tension;

Phase 8: final state=starting state with new strip.

Figure 3:
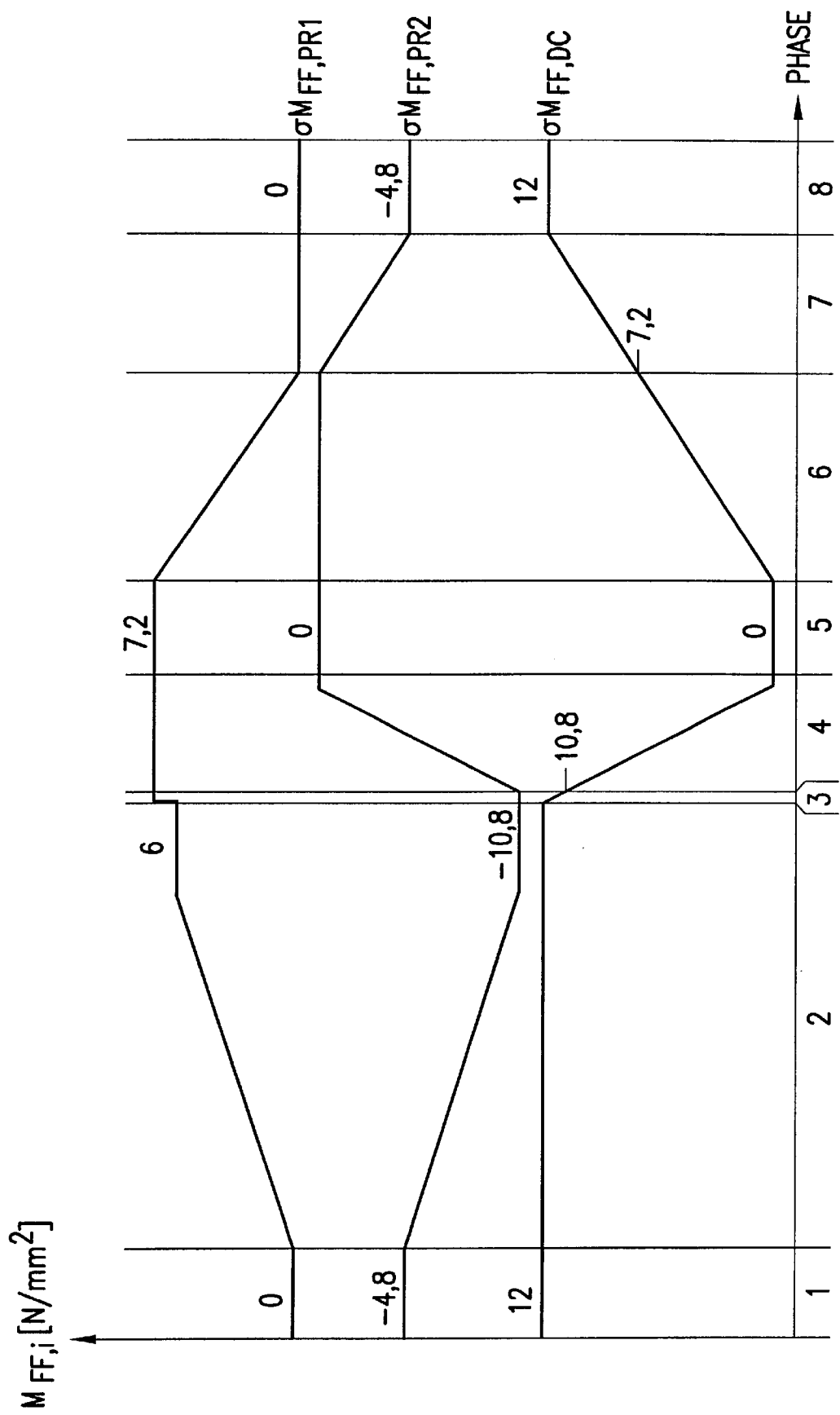
FIG. 3 shows a torque curve.

FIG. 3 as well as the following table show how the speed controllers are controlled during the individual phases:

| | Mode | | | | Predefined torques [N/mm²] | | |
|---|---|---|---|---|---|---|---|
| PHASE | WR | PR1 | PR2 | DC | $\sigma M_{FF, PR1}$ | $\sigma M_{FF, PR2}$ | $\sigma M_{FF, DC}$ |
| 1 | 0 | 1 | 1 | 1 | 0 | −4.8 | 12 |
| 2 | 0 | 1 | 1 | 1 | 0 → 6 | −4.8 → −10.8 | 12 |
| 3 | 0 | 1 | 1 | 0 | 6 → 7.2 | −10.8 | 12 → 10.8 |
| 4 | 0 | 1 | 1 | 0 | 7.2 | −10.8 → 0 | 10.8 → 0 |
| 5 | 0 | 1 | 0 | 0 | 7.2 | 0 | 0 |
| 6 | 0 | 1 | 0 | 1 | 7.2 | 0 | 0 → 7.2 |
| 7 | 0 | 1 | 1 | 1 | 0 | 0 → −4.8 | 7.2 → 12 |
| 8 | 0 | 1 | 1 | 1 | 0 | −4.8 | 12 |

To allow the effect of the predefined torques $M_{FF,i}$ on specific front torques $\sigma_i$ to be read off directly, values $\sigma M_{FF,i}$ are indicated in N/mm², from which the predefined torques are calculated using the equation $$M_{FF,i} = \sigma M_{FF,i} \cdot b_{strip} \cdot h_{strip} \cdot R_i,$$

i=WR, PR1, PR2, DC

Correspondingly, it applies to the motor torques that $$M_i = \sigma M_i \cdot b_{strip} \cdot h_{strip} \cdot R_i,$$

i=WR, PR1, PR2, DC

Phases 3 and 4 follow each other immediately without time interval so that the coiler tension is reduced from 12 to 0 N/mm² without interruption. In the same way, phases 6 and 7 follow each other immediately so that the coiler tension is built up from 0 to 12 N/mm² using a continuous ramp.

Figure 4:
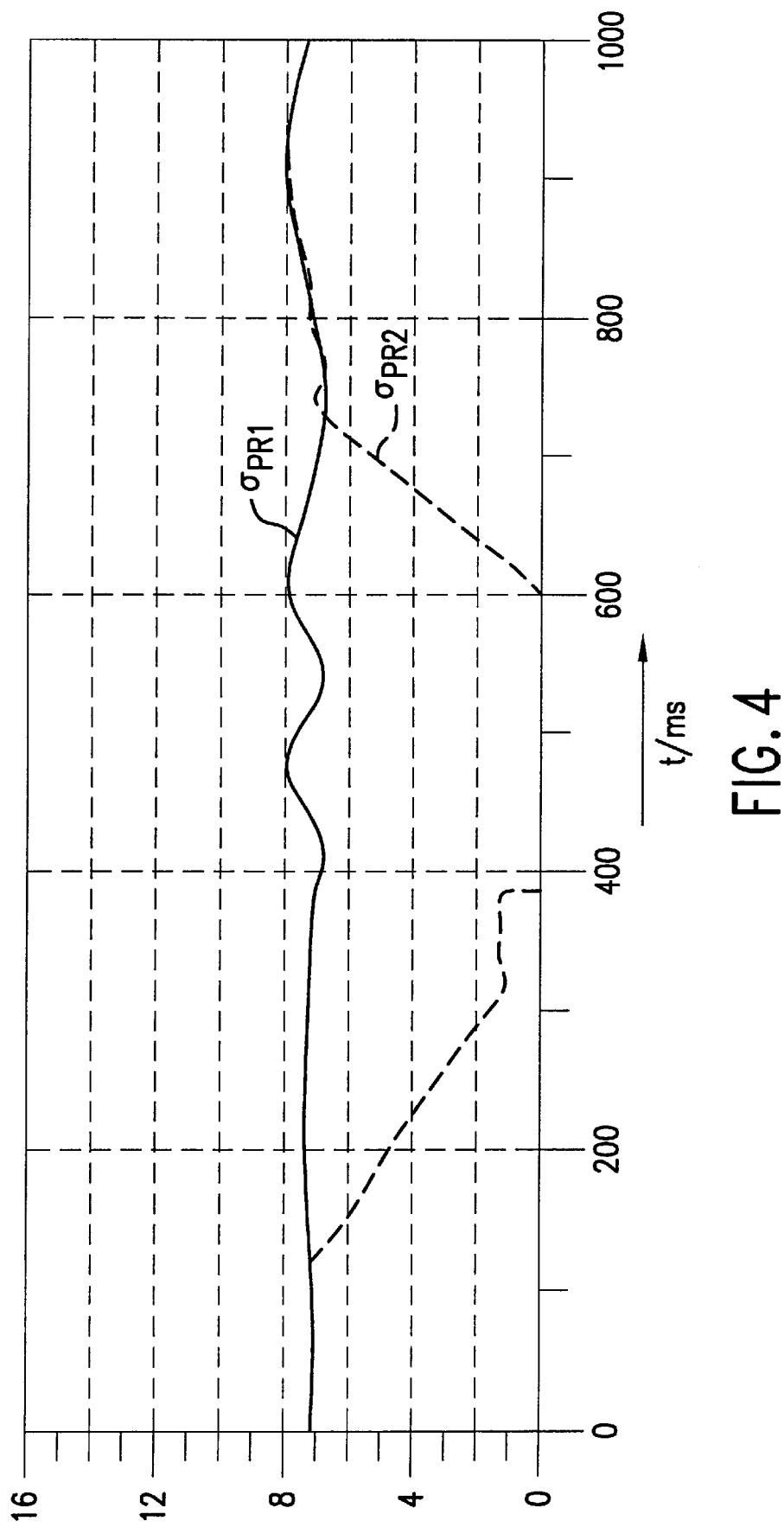
FIG. 4 shows a tensile stress curve.

FIG. 4 shows the characteristic of front tensions $\sigma_{PR1}$ and $\sigma_{PR2}$ between the working rolls and the driver rollers upstream of the shears or between the shears and the driver rollers downstream of the shears over time t. In this context, the following numerical values are taken as a basis:

| | | | |
|---|---|---|---|
| $L_{PR1}$ | = | 23955 mm | |
| $L_{PR2}$ | = | 2480 mm | |
| $L_{DC}$ | = | 4715 mm | (front metal strip 14) |
| | = | 2272 mm | (rear metal strip 13) |
| $R_{WR}$ | = | 290 mm | |
| $R_{PR1}$ | = | 250 mm | |
| $R_{PR2}$ | = | 250 mm | |
| $R_{DC}$ | = | 1000 mm | (front metal strip 14) |
| | = | 375 mm | (rear metal strip 13) |
| $J_{WR}$ | = | 21380 kgm$^2$ | |
| $J_{PR1}$ | = | 234 kgm$^2$ | |
| $J_{PR2}$ | = | 234 kgm$^2$ | |
| $J_{DC}$ | = | 14351 kgm$^2$ | (front metal strip 14) |
| | = | 2495 kgm$^2$ | (rear metal strip 13) |
| $b_{strip}$ | = | 1000 mm | |
| $h_{strip}$ | = | 3 mm | |
| $v_{strip}$ | = | 16 m/s | |
| $\sigma_{OP, PR1}$ | = | 7.2 N/mm$^2$ | |
| $\sigma_{OP, PR2}$ | = | 7.2 N/mm$^2$ | |
| $\sigma_{OP, DC}$ | = | 12 N/mm$^2$ | |
| $M_{N, WR}$ | = | 382000 Nm | |
| $M_{N, PR1}$ | = | 20400 Nm | |
| $M_{N, PR2}$ | = | 20400 Nm | |
| $M_{N, DC}$ | = | 50000 Nm | |

The cutting of metal strip 1 starts at approximately 380 m/sec. The characteristic of tensile stress $\sigma_{PR1}$ min metal strip 1 between working rolls WR and driver rollers PR1 upstream of shears 10 clearly shows the effect of the example method according to the present invention on the tensile stress downstream of working rolls WR. During the cutting operation, the tensile stress remains nearly constant downstream of working rolls WR as indicated by FIG. 4. Thus, cutting process and rolling are decoupled, i.e., the cutting of the metal strip does not influence the rolling of the metal strip.

We claim:

1. A method for cutting a metal strip which runs out from a hot-rolling mill train at a high speed, shears for cutting the metal strip are arranged downstream of the hot-rolling mill train, the shears being provided between upstream driver rollers and downstream driver rollers, the metal strip running between the upstream driver rollers and between the downstream driver rollers, the upstream driver rollers and the downstream driver rollers exerting a holding force on the metal strip, the upstream driver rollers and downstream driver rollers being controlled by drivers, the method comprising:

reducing a front tension in the metal strip between the downstream driver rollers and the downstream driver rollers to a minimum tension;

after reducing the front tension, cutting the metal strip;

during the cutting, compensating for the minimum tension;

after the cutting, reducing the front tension in the metal strip between the downstream driver rollers and a coiler; and after reducing the front tension in the metal strip between the downstream driver rollers and the coiler, opening the downstream driver rollers so that a holding force is substantially zero.

2. The method according to claim 1, wherein the cutting step includes dividing the metal strip into a rear metal strip and a front metal strip, the method further comprising:

grasping the rear Metal strip by the coiler after opening the downstream driver rollers.

3. The method according to claim 2, further comprising:

closing the downstream driver rollers after the grasping of the rear metal strip by the coiler.

4. The method according to claim 1, wherein the metal strip runs out from the mill train at a speed of greater than 12 m/s.

* * * * *